United States Patent
Chamayou et al.

(10) Patent No.: US 8,367,785 B2
(45) Date of Patent: Feb. 5, 2013

(54) METHOD FOR CONTROLLING A PROCESS FOR POLYMERISATION OF AN OLEFIN

(75) Inventors: Jean-Louis Chamayou, Carry le Rouet (FR); Pierre Sere Peyrigain, Haguenau (FR)

(73) Assignee: Ineos Europe Limited, Hampshire (GB)

( * ) Notice: Subject to any disclaimer, the term of this patent is extended or adjusted under 35 U.S.C. 154(b) by 100 days.

(21) Appl. No.: 12/737,881

(22) PCT Filed: Sep. 21, 2009

(86) PCT No.: PCT/EP2009/062180
§ 371 (c)(1),
(2), (4) Date: Feb. 25, 2011

(87) PCT Pub. No.: WO2010/037650
PCT Pub. Date: Apr. 8, 2010

(65) Prior Publication Data
US 2011/0152484 A1 Jun. 23, 2011

(30) Foreign Application Priority Data
Oct. 3, 2008 (EP) .................... 08165810

(51) Int. Cl.
*C08F 2/00* (2006.01)
*C08F 4/44* (2006.01)
*C08F 4/72* (2006.01)
*C08F 10/14* (2006.01)

(52) U.S. Cl. .................... 526/89; 526/348.2; 526/348.5; 526/159; 526/170

(58) Field of Classification Search .................. 526/159, 526/348.5, 348.2, 89, 170
See application file for complete search history.

(56) References Cited

U.S. PATENT DOCUMENTS

| | | | |
|---|---|---|---|
| 4,675,369 A * | 6/1987 | Cook et al. .................... | 526/129 |
| 6,140,264 A | 10/2000 | Kelly et al. | |
| 7,157,531 B2 * | 1/2007 | Szul et al. .................... | 526/79 |

FOREIGN PATENT DOCUMENTS

| | | |
|---|---|---|
| EP | 1 350 802 A1 | 8/2003 |
| WO | WO 93/24533 A1 | 12/1993 |
| WO | WO 01/49751 A1 | 7/2001 |
| WO | WO 2005/040226 A2 | 5/2005 |
| WO | WO 2005/049663 A2 | 6/2005 |
| WO | WO 2009/082451 A2 | 7/2009 |

OTHER PUBLICATIONS

Gross, J., et al; "Modeling Polymer Systems Using the Perturbed-Chain Statistical Associating Fluid Theory Equation of State"; *Ind. Eng. Chem. Res.*, vol. 41, pp. 1084-1093 (2002).

Novak, A., et al; "Ethylene and 1-Hexene Sorption in LLDPE under Typical Gas-Phase Reactor Conditions: Experiments"; *Journal of Applied Polymer Science*, vol. 100, pp. 1124-1136 (2006).

* cited by examiner

*Primary Examiner* — William Cheung
(74) *Attorney, Agent, or Firm* — Nixon & Vanderhye

(57) ABSTRACT

Method for controlling a process for polymerising at least one olefin in a reaction zone, the process including in the reaction zone a reaction mixture and polymer particles, the reaction mixture containing a principal olefin and at least one further reagent. The method involves using the ratio of at least one further reagent to principal olefin in the polymer particles in the reaction zone or in the amorphous phase of the polymer particles.

19 Claims, No Drawings

METHOD FOR CONTROLLING A PROCESS FOR POLYMERISATION OF AN OLEFIN

This application is the U.S. national phase of International Application No. PCT/EP2009/062180 filed 21 Sep. 2009 which designated the U.S. and claims priority to European Application No. 08165810.6 filed 3 Oct. 2008, the entire contents of each of which are hereby incorporated by reference.

The present invention relates to a method for controlling a process for polymerisation of an olefin.

Processes for the polymerisation of olefins are well known in the art. Such processes can be conducted, for example, by introducing an olefinic monomer and other reagents, such as comonomers, chain transfer agents and inert reagents, into a polymerisation reactor comprising polyolefin and a catalyst for the polymerisation.

A polymerisation process is typically controlled to achieve a desired melt index and density for the polymer at an optimum production. Conditions within the polymerisation reactor have to be carefully controlled to reduce the risk of agglomerate and/or sheet formation which may ultimately lead to bed instabilities and a need to terminate the reaction and shut down the reactor. For this reason commercial scale reactors are designed to operate well within proven stable operating zones and are used in a carefully circumscribed fashion.

The control systems for commercial polymerisation processes to obtain polymers with the desired properties are complex. For example, control systems can be either "reactive" or "predictive". "Reactive" control systems generally measure a desired property, such as density or melt index, directly in the polymer being produced, and adjust reaction conditions as required to try and ensure that the desired polymer is obtained. Whilst relatively simple to operate, there is a lag between material actually being produced and the ability to respond to variations in the properties thereof. "Predictive" control systems, in contrast, try to control the polymerisation reaction using process parameters which have been found to relate to the desired polymer properties. To date, such control systems have relied on relatively easily measurable process parameters. However, constant variations inherently occur in the reaction conditions, for example due to fluctuations in feedstock purity, there are a large number of parameters which would need to be carefully controlled to maintain constant conditions in view of these inherent variations, and the interactions between parameters are complex. It is not generally possible, therefore, to maintain all reaction conditions at constant levels using "conventional" process control techniques. Attempts to optimise process control have therefore involved identifying and using parameters which provide the best overall control. In this regard, numerous methods have been described in the literature in relation to parameters useful for controlling the polymerisation reaction. Examples of such methods include EP 0 475 603, EP 1 240 217 and EP 1 484 344.

EP 0 475 603, for example, discloses a continuous process for the polymerisation of an alpha-olefin having from 2 to 12 carbon atoms, which is carried out in a gas phase polymerisation reactor by bringing a gaseous reaction mixture containing the alpha-olefin to be polymerised into contact with a catalyst based on chromium oxide associated with a granular support and activated by a heat treatment in which the polymerisation reactor is fed with (a) alpha-olefin and (b) catalyst at constant rates.

EP 1 240 217 discloses a process for preventing polymer agglomeration and for controlling the density of copolymer produced by an alpha-olefin copolymerisation process in a polymerisation reactor, wherein the ratio of the flow rates of introduction of the comonomer(s) to the principal monomer is kept constant.

EP 1 484 344 discloses a process for controlling a continuous fluidised bed reactor (co-)polymerisation process which comprises 1) withdrawing from the reactor a hot recycle stream comprising a principal monomer and at least another unreacted reactant, 2) cooling part or all of said recycle stream withdrawn from said reactor, and 3) recycling part or all of said cooled recycle stream comprising the principal monomer and the unreacted reactant(s) through the polymerisation zone in said reactor in the presence of a polymerisation catalyst under reactive conditions, characterised in that the said controlling process consists in maintaining at least one of the reactant gradients (Gri) within a range of values which would otherwise cause sheeting or unstable operations.

The present invention relates to a new and predictive control system based on a thorough understanding of the reaction system which allows the process control to be based on reagent concentrations absorbed in the growing polymer particles in the reaction zone.

In particular, during polymerisation, growing particles of polymer are formed in the reaction zone. At temperatures below its melting point the polymer is semi crystalline, i.e. it consists of amorphous regions which exhibit a liquid-like structure, and ordered crystalline regions called crystallites. The crystallinity at ambient temperature, $\omega_{cry,25}$, can be calculated from the polymer density at ambient temperature (25° C.), $\rho_{25}$ and the densities of the crystalline and amorphous phases using the following equation:

$$\omega_{cry,25} = \frac{(\rho_{25} - \rho_{a,25})\rho_{c,25}}{(\rho_{c,25} - \rho_{a,25})\rho_{25}}$$

where $\rho_{c,25}$ and $\rho_{a,25}$ are the densities in (g cm$^{-3}$) of the crystalline phase and the amorphous phase at ambient temperature (25° C.).

To a good approximation the densities of the respective crystalline and amorphous phases can be considered to be the same for all kinds of a particular polymer type e.g. for HDPE, LDPE and LLDPE. Thus, typical values for $\rho_{c,25}$ and $\rho_{a,25}$ for polyethylene are 1.005 g cm$^{-3}$ and 0.862 g cm$^{-3}$ respectively.

Although the amorphous phase, in greater or lesser amounts, is known to be present in growing particles of polymer, the present Applicant has now surprisingly found that improved control of the polymerisation process can be obtained by using as a control parameter the ratio of a reagent other than the principal olefin to the principal olefin in the amorphous phase or in the growing particle of polymer during reaction.

In particular, it has been found that the ratio of various reagents in the amorphous phase to each other can be significantly different to the equivalent ratios in the gaseous or slurry phase, and that control by use of the ratio of a reagent other than the principal olefin to the principal olefin in the amorphous phase or in the growing particle of polymer gives significant improvements compared to control by using parameters indicative of the gas phase or slurry phase composition.

Thus, the present invention provides a method for controlling a process for polymerising at least one olefin in a reaction zone, said process comprising in the reaction zone a reaction mixture and polymer particles, the reaction mixture comprising a principal olefin and at least one further reagent, and wherein the process is controlled using the ratio of said at least one further reagent to principal olefin in the polymer particles in the reaction zone or in the amorphous phase of said polymer particles.

"Principal olefin", as used herein, means the olefin which is incorporated into the produced polymer in the greatest amount (by weight). Usually this will also be the olefin present in the reaction mixture in the greatest amount and which is provided to the reaction mixture in the greatest amount.

"Further reagent", as used herein, means a reagent other than the principal olefin, which can take part in the reaction. Such reagents are usually characterised in that they themselves are altered during the reaction and that they can (directly) alter the properties of the polymer produced. Especially suitable further reagents of the present invention are comonomers, especially olefin comonomers, and chain transfer reagents, such as hydrogen.

The reaction mixture may comprise other components which are known in the art, preferably including inert hydrocarbons. Particularly preferred inert hydrocarbons are alkanes having 4 to 8 carbons atoms, and mixtures thereof.

According to the present invention either the ratio of at least one further reagent to principal olefin in the polymer particles in the reaction zone or the ratio of at least one further reagent to principal olefin in the amorphous phase of the polymer particles is used as a process control parameter. As noted above, the polymer particles are semi crystalline, consisting of both amorphous regions and ordered crystalline regions. As used herein, therefore, the term "in" as used in respect of "at least one further reagent to principal olefin in the polymer particles" and "at least one further reagent to principal olefin in the amorphous phase of the polymer particles", refers to the amounts of said further reagents and monomers absorbed in the particles in the reaction zone. In general, the majority of the at least one further reagent and of the principal olefin present in the polymer particles are absorbed in the amorphous phase associated therewith, and hence, although either can be used in the process of the present invention, the ratio "in the polymer particles" and the ratio "in the amorphous phase of the polymer particles" generally gives a similar number.

For avoidance of doubt, references to the "further reagent" and "principal olefin" refer to said components in an unreacted state (e.g. olefinic/monomer state for the principal olefin and any comonomers). Once they react and become part of the polymer chain they are no longer considered as "reagent" or "olefin" or to contributing to the amount of said components present in the polymer particles.

The reaction of the process of the present invention may involve polymerisation of a single olefin (which will therefore also be the principal olefin). In this case the further reagent is preferably a chain transfer agent.

Alternatively, the reaction of the process of the present invention may be a copolymerisation involving two or more olefins, one of which will be the principal olefin and the other or others of which will be considered as olefin comonomers. In this case the further reagent considered may be one of the olefin comonomers.

A number of advantages can be obtained by control according to the process of the present invention. As one example, improved control can be obtained during start-up or transitioning. In particular, when desiring to produce a particular grade of polymer in a typical gas phase polymerisation process it is conventional to select a desired ratio of components in the gas phase depending on the particular grade of polymer desired. It is known, for example, that for a particular catalyst type, polymer density varies depending on the ratio of comonomer to principal olefin in the gas phase. Thus, for a specific density polymer desired it has been conventional to select a gas phase ratio of comonomer to principal olefin which might be expected (based on historic knowledge or operation) to provide polymer of approximately the desired density for a particular catalyst type. The density of the material actually produced is then analysed and the comonomer to principal olefin ratio is then modified to compensate for the difference from the desired density until the correct density material is being produced. This "trial and error" method takes time and results in production of significant off-specification ("off-spec") material.

However, it has been difficult to avoid this "trail and error" technique. The polymer initially produced is usually not of the required density because of the effects of a large number of other parameters in the process, such as temperature, pressure and other gas-phase components, such as hydrocarbons. To account for all such parameters has been too complicated for conventional process control systems, so it has been accepted that the initial material produced is likely to be off-spec, and the process is then modified in response.

In the method of the present invention (as specifically applied to density of polymer), the polymerisation is controlled using the ratio of comonomer to principal olefin in the polymer particles or in the amorphous phase of said polymer particles. This ratio has been found to result in polymer with the required density being produced regardless of variations in many other parameters which could affect the polymer produced using the conventional techniques described above, including temperature, pressure and hydrocarbon partial pressure. Thus, polymer of the required density can be produced more quickly, without the need for the conventional "trial and error" technique, resulting in quicker start-ups or transitions and without the resultant amounts of off-spec material.

Preferably, the present invention may provide a method for controlling a process for polymerising at least one olefin in a reaction zone, said process comprising in the reaction zone a reaction mixture and polymer particles, the reaction mixture comprising a principal olefin, at least one further reagent and at least one alkane having from 4 to 8 carbon atoms, and wherein the process is controlled by:
  a) determining the ratio of said at least one further reagent to principal olefin in the polymer particles in the reaction zone or in the amorphous phase of the polymer particles required in order to obtain the polymer it is desired to produce,
  b) determining conditions in the reactor which will result in the ratio of at least one further reagent to principal olefin determined in step (a), said conditions including at least:
    a. the reaction temperature, T;
    b. the partial pressure of the at least one alkane in the gas phase, $P_A$;
    c. the partial pressure of the principal olefin in the gas phase, $P_O$;
    d. the partial pressure of the at least one further reagent in the gas phase, $P_R$; and
  c) adjusting conditions in the reactor to conditions based on the conditions determined in step (b), thereby adjusting the ratio of at least one further reagent to principal olefin in the polymer particles in the reaction zone or in the amorphous phase of said polymer particles to obtain a ratio based on the ratio determined in step (a) and thereby producing the desired polymer.

The present invention may also comprise a further step:

d) maintaining the conditions in the reactor at conditions based on the conditions determined in step (b).

In general, step (c), and step (d) when present, will comprise adjusting/maintaining the reaction conditions to be as close as possible to the conditions determined in step (b). In particular, it is generally desired to control the reaction conditions to obtain an actual ratio of at least one further reagent to principal olefin in the polymer particles in the reaction zone or in the amorphous phase of said polymer particles as close as possible to the ratio determined in step (a). However, fluctuations in the actual reaction conditions will inherently occur, and this can result in variations in the actual ratio obtained in the polymer particles/in the amorphous phase of said polymer particles. The method of the present invention may allow for this by further determining acceptable ranges within which each of the reaction conditions may be allowed to vary before correction is applied.

Thus, the language adjusting/maintaining the conditions in the reactor to/at conditions "based on" the conditions determined in step (b) means adjusting to/maintaining at the determined conditions or within acceptable ranges about the determined conditions. Acceptable ranges may vary depending on the specific process condition and the sensitivity of the ratio of step (a) to changes in the particular process condition, but will preferably be a range of +/−5% relative to the determined condition of step (b), more preferably a range of +/−2% relative to the determined condition of step (b).

Similarly, and most preferably, the ratio of at least one further reagent to principal olefin in the polymer particles in the reaction zone or in the amorphous phase of said polymer particles is maintained within a range of +/−5% relative to the determined ratio of step (a), more preferably a range of +/−2% relative to the determined ratio of step (a).

The required values of step (a) and step (b) may be determined, for example, using a suitable model or simulation software.

For example, the "ratio of at least one further reagent to principal olefin in the polymer particles in the reaction zone or in the amorphous phase of the polymer particles" is dependent on (and can be calculated based on) the mass fraction of amorphous phase present in the polymer, the gas or slurry phase composition and the relative solubilities of the respective components in the amorphous phase.

Solubility data for various components, as well as co-absorption effects of combinations of components (where the presence of one component increases or decreases the solubility of another component) can be measured experimentally or calculated according to methods known in the art in order to calculate the amounts of the respective components in the polymer particles or in the amorphous phase. Experimental measurements can be done for example with gravimetric absorption analysers such as the ISOSorp series commercialised by the Rubotherm GmbH, Germany or by the Gravimetric instruments of the IGA series from the Hiden Isochema Limited, UK.

Similarly, methods of measuring or calculating the amount of amorphous phase based on the composition of the reaction mixture are also known to the person skilled in the art. Generally speaking, it is expected that the amount (mass fraction) of amorphous phase increases with increased partial pressure of "heavy" components, such as C4 and above hydrocarbons. Particular examples of such components are comonomers such as 1-hexene and 1-octene, and saturated hydrocarbons, such as pentane and hexane.

The exact method/model by which the desired ratio of at least one further reagent to principal olefin in the polymer particles or in the amorphous phase is determined in step (a), along with the determination of the process conditions to obtain said ratio in step (b) is not especially critical, as long as a consistent basis is used. Thus, even if small differences could be obtained by using different experimental set-ups for a measured ratio, or by using different calculations, the key point of the present invention is that the process is controlled using a value which is measured or calculated on a consistent basis by the operator.

For example, for step (b), a particularly preferred model uses the Perturbed-Chain Statistical Associating Fluid Theory ("PC-SAFT") Equations of State, the use of which for polyolefins is described by Gross and Sadowski in Ind. Eng. Chem. Res. 2002, 41, p. 1084-1093.

The values for step (a) require an understanding of the relationship between the desired polymer properties and the ratio of at least one further reagent to principal olefin in the polymer particles in the reaction zone or in the amorphous phase of the polymer particles. However, these can be readily generated using the same model as used for step (b) and using "known" data of process conditions to calculate the ratio of at least one further reagent to principal olefin in the polymer particles in the reaction zone or in the amorphous phase of the polymer particles, and correlating this to the polymer properties obtained in the known operation. The "known" data is preferably experimentally derived, and most preferably based on "historical" operation.

The critical reaction conditions, by which is meant those on which the ratio in the amorphous phase ratio is most dependent, are those identified above, namely:

a. the reaction temperature, T;
b. the partial pressure of the at least one alkane in the gas phase, $P_A$;
c. the partial pressure of the principal olefin in the gas phase, $P_O$;
d. the partial pressure of the at least one further reagent in the gas phase, $P_R$.

Good control of a polymerization process has been obtained using a model based on these parameters. Nevertheless, other reaction conditions, such as reaction pressure, can also be used in step (b). Whilst these may provide some improvements in the accuracy of the model/determination, the benefits are comparatively lower compared to the increased complexity.

A further example of the advantages of the method of the present invention is that because of the uncertainty in the properties of the material that will be initially produced using the conventional "trial and error" technique is has been difficult to produce materials with properties close to the limits of the operating window of the polymerisation process. Using density as an example again, if the density of polymer is too low agglomerates can be formed, which may result in shutdown of the reaction. It is therefore risky for an operator to try and produce a polymer with density close to the low density limit. In worst-case scenarios safety issues can also arise from operating close to process limits.

In contrast in the process of the present invention the high level of confidence in producing the desired material "first-time" allows the start-up or transition to the desired polymer much more quickly even if it is close to an operating limit of the process.

In particular embodiments, therefore, the present invention provides a method for controlling a process for polymerising at least one olefin in a reaction zone during start-up or transition, said process comprising in the reaction zone a reaction mixture and polymer particles, the reaction mixture comprising a principal olefin and at least one further reagent, and wherein the start-up or transition is controlled using the ratio of at least one further reagent to principal olefin in the polymer particles in the reaction zone or in the amorphous phase of said polymer particles.

Even when not starting-up or transitioning, the method of the present invention provides improved control. Despite the best intentions of operators, processes do not operate with constant values of all parameters which might affect the polymer produced. Operators try to control as many parameters as practical and necessary to maintain the desired polymer properties, but this is complicated due to the number of parameters and their interrelationships, and undesired variations in the polymer produced can occur.

In the method of the present invention relatively simple control of the process is obtained by using the ratio of at least one further reagent to principal olefin in the polymer particles or in the amorphous phase because control of such parameters has been found to produce the required polymer regardless of variations in many of the other parameters.

The method of the present invention may be carried out in any suitable polymerisation process. In particular, and although the advantages of the method have been exemplified above in respect of certain gas phase operation, the method of the present invention may be applied to polymerisation conducted in either the slurry phase or in the gas phase.

The method is preferably applied to a continuous process.

When reaction is in the gas phase, the method may be carried out in a stirred and/or gas fluidised bed. Gas phase polymerisation of a polymerisable olefin or mixture thereof to produce normally solid polymer substances using a quench-cooled, gas-phase polymerisation reactor containing a sub-fluidised particulate bed of polymerised olefin has been described in a number of patents including: U.S. Pat. No. 3,957,448, U.S. Pat. No. 3,965,083 and U.S. Pat. No. 3,971,768. These U.S. patents describe polymerisation processes and apparatus in which polymer is formed from gaseous olefin in horizontal stirred-bed vessels.

Preferably, the method of the present invention is carried out continuously in the gas phase in a fluidised-bed reactor. Such processes are well-known, and examples include EP 0 475 603, EP 1 240 217, EP 1 484 344 and EP 0 855 411.

In such processes, the particles of polymer being formed are maintained in the fluidised state by virtue of a reaction gas mixture containing the monomer(s) to be polymerised travelling in a rising stream. The polymer thus manufactured in powder form is generally drained from the reactor in order to keep the bed of fluidised polymer particles at a more or less constant volume. The process generally employs a fluidisation grid which distributes the reaction gas mixture through the bed of polymer particles and which acts as a support for the bed in the event of a cut in the flow of the rising gas. The reaction gas mixture leaving at the top of the fluidised-bed reactor is recycled to the base of the latter under the fluidisation grid by means of an external circulation conduit.

The polymerisation of the olefins is an exothermic reaction. The reaction mixture comprising the olefins to be polymerised is generally cooled by means of at least one heat exchanger arranged on the outside of the reactor before being recycled. Liquid, especially but not limited to liquid condensed from the cooled reaction mixture during recycle, may be injected into the reaction zone. Vaporisation of the liquid in the reaction zone provides the effect of cooling directly in the reaction zone.

The method of the invention is particularly suitable for very large industrial reactors; in accordance with one embodiment of the present invention, the reactor used makes it possible to produce quantities of polymer of more than 3000 kg/h, preferably more than 10,000 kg/h. The process of the invention is further particularly suitable for high production rates (i.e. the space time yield in terms of weight of polymer produced per unit volume of reactor space per unit time) in commercial gas fluidised bed reactors; consequently, according to a further embodiment of the present invention, space time yields are higher than 25 kg/m$^3$/h, preferably higher than 50 kg/m$^3$/h, more preferably higher than 80 kg/m$^3$/h.

The principal olefin is preferably selected from olefins having 2 to 6 carbon atoms such as ethylene, propylene, 1-butene, 1-hexene and 4-methyl-1-pentene, and more preferably is ethylene or propylene.

Comonomer olefins, where present, are preferably selected from olefins having 2 to 12 carbon atoms. Suitable comonomer olefins are ethylene, propylene, 1-butene, 1-hexene, 4-methyl-1-pentene and 1-octene. Preferably, the principal olefin is ethylene or propylene and the comonomer is ethylene, propylene, 1-butene, 1-hexene or 1-octene. More preferably, the olefin is ethylene and the comonomer is 1-butene, 1-hexene or 1-octene, preferably 1-hexene or 1-octene.

The reaction mixture may also comprise one or more inert compounds, especially inert gases such as nitrogen, and/or one or more saturated hydrocarbons such as ethane, propane, butane, pentane and hexane.

The method of the present invention is useful even when only small amounts of amorphous phase are present, since this can still show a significantly different ratio of at least one further reagent to principal olefin in the polymer particles or in the amorphous phase thereof compared to the gas or slurry phase. However, it has been found that the difference between the ratio of at least one further reagent to principal olefin in the polymer particles or in the amorphous phase and the equivalent ratio in the gas or slurry phase is not independent of the amount of amorphous phase but increases significantly and non-linearly where increased amounts of amorphous phase are present on the polymer particles. It is under these conditions therefore that the largest improvements can be obtained compared to control of a polymerisation process by using parameters indicative of the gas or slurry phase composition. Typically, therefore, at least 20 wt % of amorphous phase is present on the polymer, more preferably at least 40 wt %. As used herein, the "amount" of amorphous phase refers to the mass fraction, which is based on total weight of polymer, including the amorphous phase, averaged over all polymer particles in the reaction zone. Determination of amount of amorphous phase for the purposes of the present invention may be obtained by running a Differential Scanning Calorimetry (DSC) test and determining the enthalpy required to melt the sample; the percentage of crystalline phase being then determined by dividing the enthalpy of the sample by the enthalpy of a pure crystalline polymer (293 μg).

The present invention comprises controlling the process using the ratio of at least one further reagent to principal olefin in the polymer particles in the reaction zone or in the amorphous phase of said polymer particles within the reaction zone.

By "the ratio of at least one further reagent to principal olefin" is meant the molar or mass ratio of said components or any other parameter which can be directly or simply correlated thereto. The use of the mass or molar ratio of the at least one further reagent to principal olefin in the amorphous phase of the polymer particles in the reaction zone is generally preferred. For avoidance of any doubt, the "ratio of at least one further reagent to principal olefin in the amorphous phase of the polymer in the reaction zone" is distinct to the ratio of the at least one further reagent to principal olefin in the gas phase (or slurry phase) within the reaction zone because the ratio in the gas phase (or slurry phase) and the ratio in the amorphous phase, have been found not to be simply related.

In particular in this regard it is worth noting that although under any one particular set of reaction conditions the ratio in the polymer particles or in the amorphous phase is dependent on the ratio in the gas phase, this relationship can change as soon as any of a number of reaction conditions changes. Thus, keeping the ratio in the gas phase constant does not keep the ratio in the polymer particles or in the amorphous phase constant unless all reaction parameters stay the same ("steady state").

Similarly, the ratio of the feed flow rates to the reactor of a further reagent to the principal olefin is not considered to be simply related to the ratio of at least one further reagent to principal olefin in the polymer particles or in the amorphous phase of said polymer in the reaction zone.

In a most preferred embodiment, one or more saturated hydrocarbons selected from C4+ alkanes, especially pentane and/or hexane, is present at a (total) partial pressure of at least 0.05 MPa.

Particularly preferred parameters useful for the present invention are the ratio of chain transfer reagent, especially hydrogen, to principal olefin in the polymer particles or in the amorphous phase and/or the ratio of olefin comonomer to principal olefin in the polymer particles or in the amorphous phase.

In particular, use of the ratio of chain transfer reagent, especially hydrogen, to principal olefin in the polymer particles or in the amorphous phase provides control of melt index and use of the ratio of comonomer to principal olefin in the polymer particles or in the amorphous phase provides control of density.

As is apparent from the above, the method for controlling a polymerisation process according to the present invention may be considered a method for controlling the properties of the polymer produced. Any suitable properties of the polymer to be produced may be used as basis for the control method, but especially preferred properties of the produced polymer on which to base the control are the desired density and melt index of the polymer being produced.

Thus, in a preferred embodiment the present invention provides a method as defined herein for controlling the melt index and/or density of the polymer produced.

Co-absorption can also affect the overall productivity of the catalyst. Thus, for example, the productivity can be modified by changing the ratio of an inert hydrocarbon to the comonomer or the principal olefin in the polymer particles or in the amorphous phase. For example, it has been observed that for metallocene catalysts that an increase of pentane partial pressure leads to an increase of the catalyst productivity. This parameter, whilst not necessary for control according to the process of the present invention may be considered when operating a polymerisation process. In a preferred embodiment, "high" partial pressures of inert hydrocarbons are employed in the process of the present invention, by which is meant that the process is operated with one or more inert hydrocarbons at a partial pressure above 0.5 times the saturated vapour pressure of said one or more inert hydrocarbons (the vapour pressure taken at the polymerisation temperature), preferably in the range 0.8 to 0.95 times the saturated vapour pressure of said one or more inert hydrocarbons.

This allows high productivity to be achieved. This will also generally result in relatively high levels of amorphous phase in the polymer particles, but the method according to the present invention still allows control of the polymerisation process to be obtained.

More than one control parameter may be used in the overall control of the polymerisation process. In a preferred example, at least two ratios of at least one further reagent to principal olefin in the polymer particles or in the amorphous phase of the polymer particles within the reaction zone may be used. For example, the molar ratio of chain transfer reagent, especially hydrogen, to principal olefin in the polymer particles or in the amorphous phase and the molar ratio of olefin comonomer to principal olefin in the polymer particles or in the amorphous phase may be used together to provide control of both melt index and density.

Use of the ratio of at least one further reagent to principal olefin in the polymer particles or in the amorphous phase of the polymer particles within the reaction zone as a control parameter, as used herein, means that the parameter is maintained at a defined value or within a defined range, and variations from this value or range are reacted to by the control system and/or operator of the process to bring the parameter back to the desired value or back within the defined range.

A number of suitable responses to variations would be apparent to the person skilled in the art, but non-limiting examples include increases or decreases in the partial pressures of principal olefin, further reagent or any saturated hydrocarbons present. In particular, for a gas phase process, although the ratio of the further reagent to the principal olefin in the polymer particles or in the amorphous phase of said particles is not the same as the gas phase ratio, increase in the gas phase partial pressure of the further reagent or principal olefin will generally result in an increase in the same component present in the polymer particles or in the amorphous phase. Although such a response may nominally be equivalent to the response that may be applied using control based on the ratio in the gas phase, if variation in polymer properties occurs due to a factor other than a variation in the gas phase ratio (which would clearly be the case if the gas phase ratio is being controlled) then the variation may only be detected by analysing the produced polymer and realising it had gone off-specification. In contrast, the control according to the present invention can allow response before production of the off-specification material in the first place.

As noted previously, the majority of the at least one further reagent and of the principal olefin present in the polymer particles is present in the amorphous phase associated therewith, and hence the ratio "in the polymer particles" and the ratio "in the amorphous phase of the polymer particles" are similar. However, it is generally preferred to use the ratio in the amorphous phase itself.

It will be apparent that the optimum defined value or the defined range will depend on the particular parameter being used and the desired product.

For metallocene catalyst, where hydrogen is used as the chain transfer agent, the optimum mass ratio of hydrogen to the principal olefin in the amorphous phase has been found to be in the range $1.66 \times 10^{-5} * \ln(MI)$ to $1.66 \times 10^{-5} * \ln(10 \times MI)$, and most preferably in the range $1.66 \times 10^{-5} * \ln(2 * MI)$ to $1.66 \times 10^{-5} * \ln(5 \times MI)$ where MI is the melt index of the polymer it is desired to produce.

As used in the equations above, and as used generally herein, melt index, or MI, has units of g/10 minutes and is determined at 190° C. and under a mass of 2.16 kg according to ASTM D1238.

For Ziegler-Natta catalyst, where hydrogen is used as the chain transfer agent, the optimum mass ratio of hydrogen to the principal olefin in the amorphous phase has been found to be in the range $7.1 \times 10^{-4} * \ln(MI/0.7)$ to $0.021 * \ln(MI/0.7)$, and most preferably in the range $3.6 \times 10^{-4} * \ln (MI/0.7)$ to $0.011 * \ln (MI/0.7)$ where MI is the melt index of the polymer it is desired to produce.

As a further example, for metallocene, the optimum mass ratio of comonomer to the principal olefin in the amorphous phase has been found to be in the range (953-D)/200 to (953-D)*3/100 and preferably in the range (953-D)*3/400 to (953-D)/75, where D is the non annealed density in kg/m³ of the polymer that is desired to produce. The density, D, should be measured in a density gradient column filled with a mixture of water and iso-propanol according to ASTM D1505-03. The samples should be prepared by extrusion at 190° C. as taught by ASTM D2839-05.

For Ziegler-Natta catalyst, the optimum mass ratio of comonomer to the principal olefin in the amorphous phase has been found to be in the range (958-D)*3/20 to (958-D)*3/2 and preferably in the range (958-D)/5 to (958-D)*3/4, where D is the non annealed density in kg/m³ of the polymer that is desired to produce.

The method according to the present invention may be used to prepare a wide variety of polymer products. Polyethylenes are the preferred product, and the most preferred product is linear low density polyethylene (LLDPE), especially based on copolymers of ethylene with 1-butene, 1-hexene or 1-octene. A further suitable polyethylene product is high density polyethylene (HDPE), especially copolymers of ethylene with a small portion of higher alpha olefin, for example, 1-butene, 1-pentene, 1-hexene or 1-octene.

The method is particularly suitable for polymerising olefins in the gas phase at an absolute pressure of between 0.5 and 6 MPa and at a temperature of between 30° C. and 130° C. For example, for LLDPE production the temperature is suitably in the range 75-100° C. and for HDPE the temperature is typically 80-115° C. depending on the activity of the catalyst used and the polymer properties desired.

The total pressure in the gas phase polymerisation reactor is most preferably between 1.5 and 3 MPa.

The method of the present invention may be applied to polymerisation processes using any suitable polymerisation catalyst, including Ziegler-Natta type catalysts chromium oxide type catalysts, and metallocene type catalysts.

The copolymerisation may therefore be carried out, for example, in the presence of a catalyst of Ziegler-Natta type comprising at least one transition metal in combination with a cocatalyst comprising an organometallic compound, for example an organoaluminium compound. The catalyst essentially comprises an atom of a transition metal selected from the metals of groups IV to VI of the periodic classification of the elements, such as titanium, vanadium, chromium, zirconium or hafnium, optionally a magnesium atom and a halogen atom. The catalyst may be supported on a porous refractory oxide such as silica or alumina or may be combined with a solid magnesium compound, such as the chloride, the oxide, the hydroxy chloride or an alcoholate of magnesium. By way of example, mention may be made of the catalysts described in the U.S. Pat. No. 4,260,709, EP 0 598 094, EP 0 099 774 and EP 0 175 532. The present invention is also particularly appropriate for silica-supported Ziegler catalysts, for example those described in Patents WO 93/09147, WO 95/13873, WO 95/34380, WO 99/05187 and U.S. Pat. No. 6,140,264. The catalyst can be used as it is or optionally in the form of a coated catalyst or prepolymer containing, for example, from $10^{-5}$ to 3, preferably from $10^{-3}$ to $10^{-1}$, millimoles of transition metal per gram of polymer; it can be used together with a cocatalyst or activator, e.g. an organometallic compound of a metal from groups I to III of the Periodic Classification of the Elements, such as, for example, an organoaluminium compound. It is also possible to use a catalyst complexed by a metal selected from those of group VIII of the periodic classification of the elements, such as, for example, nickel, iron or cobalt. By way of examples, mention may be made of those described in Patent Application WO 98/27124 or WO 98/2638. It is also possible to use catalysts based on platinum or palladium as the transition metal; complexes of this type are described, for example, in the Patent WO 96/23010.

The copolymerisation may thus also be carried out in the presence of a chromium oxide catalyst. Examples of chromium oxide catalysts are typically those comprising a refractory oxide support which is activated by a heat treatment advantageously carried out at a temperature of at least 250° C. and at most equal to the temperature at which the granular support begins to sinter and under a non-reducing atmosphere and preferably an oxidising atmosphere. This catalyst can be obtained by a great number of known process, in particular by those according to which, in a first stage, a chromium compound, such as a chromium oxide, generally of formula CrO3, or a chromium compound which can be converted by calcination into chromium oxide, such as, for example, a chromium nitrate or sulphate, an ammonium chromate, a chromium carbonate, acetate or acetylacetonate, or a tert-butyl chromate, is combined with a granular support based on refractory oxide, such as, for example, silica, alumina, zirconium oxide, titanium oxide or a mixture of these oxides or aluminium or boron phosphates or mixtures in any proportion of these phosphates with the above mentioned oxides. In a second stage, the chromium compound thus combined with the granular support is subjected to a so-called activation operation by heat treatment in a non-reducing atmosphere and preferably an oxidising atmosphere at a temperature of at least 250° C. and at most that at which the granular support begins to sinter. The temperature of the heat treatment is generally between 250° C. and 1200° C. and preferably between 350 and 1000° C. Such catalyst preferably contains from 0.05 to 5%, more preferably from 0.1 to 2%, by weight of chromium; it can contain, in addition to the chromium, from 0.1 to 10% of titanium in the form of titanium oxide and/or fluorine and/or aluminium, in particular in the form of aluminium oxide; it can be used as it is or optionally in the form of a coated catalyst or prepolymer containing, for example, from $10^{-5}$ to 3, preferably from $10^{-3}$ to $10^{-1}$, millimoles of chromium per gram of polymer. The chromium oxide catalysts may be used together with a cocatalyst or activator, e.g. an organometallic compound of a metal from groups I to III of the Periodic Classification of the Elements, such as, for example, an organoaluminium compound. Examples of catalysts can be found, for example, in EP 0 275 675, EP 0 453 116, or WO 99/12978.

Most preferably, the method of the present invention is applied to a polymerisation process in which the catalyst is a metallocene-type catalyst. In particular, the present invention has been found to provide significant improvements when used for such systems. Without wishing to be bound by theory, this is believed to be related to the particular reactivity profiles of metallocene catalysts. For example, compared to Ziegler-Natta catalysts, metallocene catalysts have a higher affinity for comonomer incorporation, and therefore the ratio of comonomer to olefin passed to the reaction mixture for a particular grade is generally much lower for metallocene catalysts than for Ziegler-Natta catalysts. This makes such systems much more sensitive to small variations in the comonomer concentration and in the ratio of comonomer to principal olefin; therefore control of this ratio in the polymer particles or in the amorphous phase according to the present invention provides greater improvements in the overall process control.

With regards to particular metallocene-type catalysts, mention may be made, by way of example, of those corresponding to the formula

[L]mM[A]n where L is a bulky ligand; A is a leaving group, M is a transition metal and m and n are such that the total valency of the ligand corresponds to the valency of the transition metal.

The ligands L and A may be bridged. L is generally a ligand of the cyclopentadienyl type.

Examples of metallocene catalysts of this type are described in U.S. Pat. Nos. 4,530,914, 5,124,418, 4,808,561, 4,897,455, 5,278,264, 5,278,119, 5,304,614, and EP 0 129 368, EP 0 591 756, EP 0 520 732, EP 0 420 436, WO 91/04257, WO 92/00333, WO 93/08221, WO 93/08199.

It is also possible to use with advantage the metallocene-based catalyst systems as described in U.S. Pat. Nos. 4,871,705, 4,937,299, 5,324,800, 5,017,714, 5,120,867, 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP 0 561 476, EP 0 279 586, EP 0 594 218, WO 94/10180 and WO 2006/085051.

Mention may also be made of the Patents WO 92/00333, WO 94/07928, WO 91/04257, WO 94/03506, U.S. Pat. Nos. 5,057,475, 5,096,867, 5,055,438, 5,198,401, 5,227,440, 5,264,405, EP-A-0 420 436, U.S. Pat. Nos. 5,604,802, 5,149,819, 5,243,001, 5,239,022, 5,276,208, 5,296,434, 5,321,106, 5,329,031, 5,304,614, WO 93/08221, WO 93/08199 and EP 0 578 838. The preferred transition metal compounds of the catalyst are those of group 4, in particular zirconium, titanium and hafnium.

The metallocene catalyst may also be represented by the general formula (Cp)m MRnR'p, where Cp is a ring of the cyclopentadienyl type, M is a transition metal of group 4, 5 or 6; R and R' may be selected from halogens and hydrocarbyl or hydrocarboxyl groups; m=1-3, n=0-3, p=0-3 and the sum m+n+p equals the oxidation state of M; preferably, m=2, n=1 and p=1.

The metallocene catalyst may be also represented by the general formula (C5R'm)pR"s(C5R'm)MeQ3-p-x, or R"s(C5R'm)2MeQ' where Me is a transition metal of group 4, 5 or 6, at least one C5 R'm is a substituted cyclopentadienyl, each R', which may be identical or different, is hydrogen, an alkyl, alkenyl, aryl, alkylaryl or arylalkyl radical having 1 to 20 carbon atoms, or two carbon atoms linked together to form part of a substituted or unsubstituted ring having 4 to 20 carbon atoms, R" is a radical containing one or more or a combination of carbon, germanium, silicon, phosphorus or nitrogen atoms which bridges two rings (C5 R'm), or which bridges one ring (C5 R'm) to M, when p=0, x=1, else "x" is always 0, each Q, which may be identical or different, is an alkyl, alkenyl, aryl, alkylaryl or arylalkyl radical having 1 to 20 carbon atoms, a halogen or an alkoxide, Q' is an alkylidene radical having 1 to 20 carbon atoms, s is 0 or 1, and when s is 0, m is 5 and p is 0, 1 or 2 and when s is 1, m is 4 and p is 1.

The metallocene catalysts are generally used with an activator or cocatalyst. Examples which may be mentioned include alumoxane and/or ionic or neutral ionising activators, or compounds such as pentafluorophenyl tri(n-butyl)ammonium tetraborate or the boric metalloid precursor of trisperfluorophenyl, which ionises the neutral metallocene compound. Compounds of this type are described in EP 0 570 982, EP 0 520 732, EP 0 495 375, EP 0 426 637, EP 0 500 944, EP 0 277 003, EP 0 277 004, U.S. Pat. Nos. 5,153,157, 5,198,401, 5,066,741, 5,206,197 and 5,241,025, and WO 94/07928.

Catalyst combinations may also be used, for example those described in U.S. Pat. Nos. 5,281,679, 4,701,432, 5,124,418, 5,077,255 and 5,183,867.

Other examples of metallocene catalysts are described in Patents EP 0 593 083, U.S. Pat. Nos. 5,317,036, 4,937,217, 4,912,075, 4,935,397, 4,937,301, 4,914,253, 5,008,228, 5,086,025, 5,147,949, 4,808,561, 4,897,455, 4,701,432, 5,238,892, 5,240,894, 5,332,706, WO 95/10542, WO 95/07939, WO 94/26793 and WO 95/12622.

Preferably, the metallocene comprises
A) an inert support,
B) a group 4-10 metal complex corresponding to the formula:

where M is a metal of one of groups 4 to 10 of the Periodic Table of the Elements, Cp is an anionic ligand group,
Z is a divalent moiety linked to Cp and linked to M, comprising boron or an element of group 14 of the Periodic Table of the Elements, and further comprising nitrogen, phosphorus, sulphur or oxygen;
X is a neutral conjugated diene ligand group having up to 60 atoms, or a dianionic derivative, and
C) an ionic cocatalyst capable of converting the metal complex into an active polymerisation catalyst.

Examples of cocatalysts are described in U.S. Pat. Nos. 5,132,380, 5,153,157, 5,064,802, 5,321,106, 5,721,185 and 5,350,723. Mention may also be made of the complexes described in WO 96/28480 and WO 98/27119.

The catalyst may be used in the form of a prepolymer prepared beforehand during a prepolymerisation step from catalysts described above. The prepolymerisation may be carried out by any process, for example a prepolymerisation in a liquid hydrocarbon or in gas phase in accordance with a batchwise, semicontinuous or continuous process.

The catalyst or the prepolymer may be introduced into the reactor continuously or discontinuously.

In a further embodiment, the present invention also provides a process for polymerising at least one olefin in a reaction zone, said process being controlled using the method described herein.

The Examples which follow illustrate the present invention. The Examples are all based on a model of the process which calculates the mass ratio of various components in the amorphous phase of the polymer particles and which has been developed by comparison of calculated sorption values for various components with actual plant data using a PC-SAFT model as described above. For the purposes of illustrating the control process of the present invention as applied to transitions and start-ups the Examples are presented as such, but the actual operating data in all the Examples represent actual conditions under which polymerisation reactions have been successfully run with the defined amorphous phase ratios to produce the desired products.

EXAMPLES

Example 1

In this example it is desired to produce an ethylene/1-hexene copolymer using a metallocene HPLL catalyst prepared according to Example 1 of WO 2006/085051 and in a fluidised bed with a diameter of 0.74 m and a height of 5 m.

It is desired to produce an ethylene/1-hexene copolymer with a density of 918 kg/m$^3$ and a Melt Index of 1.2 g/10 minutes. The reaction is to be performed at a temperature of 80° C. and a total pressure of 21 bar (2.1 MPa) using a gas mixture of 1-hexene, ethylene, ethane, pentane, hydrogen and nitrogen.

Based on these parameters the desired amorphous phase mass ratio of 1-hexene to ethylene for this product is calculated to be 0.37 and the desired amorphous phase mass ratio of hydrogen to ethylene is calculated to be $2.4\times10^{-5}$.

The following gas phase composition and conditions are determined in order to obtain the required ratios and maintain them at the required values:
Fluidisation velocity=40 cm/s;
Ethylene partial pressure (PC2)=13 bar (1.3 MPa);
Ratio of 1-hexene to ethylene partial pressures in gas phase (PC6/PC2)=0.005;
Ratio of hydrogen to ethylene partial pressures (PH2/PC2)=0.002;
Ethane partial pressure=0.08 bar (8 kPa);
Pentane partial pressure (PC5)=0.5 bar (50 kPa);
Nitrogen partial pressure=7.33 bar (0.733 MPa) (balance);
Condensation rate=0.

Once started the above composition results in the desired polymer at a production rate of 210 kg/h. This Example shows that the required product can be obtained directly by controlling the mass ratios in the amorphous phase on start-up.

Example 2

It is desired to transition from the product being produced in Example 1 to a different product, being an ethylene/1-hexene copolymer with a density of 912 kg/m$^3$ and a Melt Index of 1.2 g/10 minutes. The desired amorphous phase mass ratio of 1-hexene to ethylene for this product is calculated to be 0.45, with the desired hydrogen to ethylene mass ratio in the amorphous phase being $2.2\times10^{-5}$ (this being similar to Example 1)

To obtain the increased 1-hexene to ethylene mass ratio in the amorphous phase compared to Example 1, it is determined to reduce the reaction temperature to 70° C. For the same ethylene partial pressure as Example 1 this results in the desired increased C6/C2 ratio in the amorphous phase even though the gas phase pressure ratio remains unchanged. It is also calculated that in order to maintain the same mass ratio of hydrogen to ethylene in the amorphous phase, and hence a product with they same Melt Index as Example 1, it is necessary to increase the hydrogen to ethylene gas phase ratio.

The following "new" gas phase composition and conditions are determined in order to obtain the required ratios and maintain them at the required values:
Total pressure=21 bar (2.1 MPa);
Fluidisation velocity=40 cm/s;
Ethylene partial pressure (PC2)=13 bar (1.3 MPa);
Ratio of 1-hexene to ethylene partial pressures in gas phase (PC6/PC2)=0.005;
Ratio of hydrogen to ethylene partial pressures (PH2/PC2)=0.003;
Ethane partial pressure=0.08 bar (8 kPa);
Pentane partial pressure (PC5)=0.5 bar (50 kPa);
Nitrogen partial pressure=7.32 bar (0.733 MPa) (balance);
Condensation rate=0.

Transition of the process conditions from those of Example 1 to those above results in the newly desired polymer. This Example again shows that the required product can be obtained by controlling the mass ratios in the amorphous phase. Comparison of Example 2 with Example 1 also shows that 2 different products, with different densities can be obtained with the same gas phase 1-hexene and ethylene pressures and ratio, showing the importance of controlling the amorphous phase mass ratio rather than relying on the gas phase ratios.

Example 3

In this example Example 1 is repeated to again produce an ethylene/1-hexene copolymer with a density of 918 kg/m$^3$ and a Melt Index of 1.2 g/10 minutes. The reaction is performed at a temperature of 80° C., the desired amorphous phase mass ratio of 1-hexene to ethylene is calculated to be 0.37, and the desired hydrogen to ethylene mass ratio in amorphous phase is $2.4\times10^{-5}$.

In this case the following gas phase composition is used in order to obtain the required ratios and maintain them at the required values:
Total pressure=21 bar (2.1 MPa);
Fluidisation velocity=40 cm/s;
Ethylene partial pressure (PC2)=13 bar (1.3 MPa);
Ratio of 1-hexene to ethylene partial pressures in gas phase (PC6/PC2)=0.0048;
Ratio of hydrogen to ethylene partial pressures (PH2/PC2)=0.0024;
Ethane partial pressure=0.11 bar (11 kPa);
Pentane partial pressure (PC5)=1.5 bar (0.15 MPa);
Nitrogen partial pressure=6.3 bar (0.63 MPa) (balance);
Condensation rate=0.

Again the above composition is found to result in the desired polymer at a production rate of 210 kg/h. It is worth noting that compared to Example 1 these conditions use an increased pentane pressure. The amount of pentane absorption in the polymer is calculated as 3.7% wt (compared to 0.9 wt % in Example 1). Due to this increased amount of pentane absorption (compared to Example 1) the gas phase 1-hexene to ethylene ratio and hydrogen to ethylene ratio are changed to compensate and give the same final product. These results are also consistent with Example 2 and show that the C6/C2 mass ratio in the amorphous phase increases unless the gas phase ratio is reduced to compensate. Similarly, to maintain the same mass ratio of hydrogen to ethylene in the amorphous phase, and hence a product with the same Melt Index as Example 1 it is necessary to increase the hydrogen to ethylene gas phase ratio.

This Example also shows that the same polymer can be obtained by significantly different gas phase conditions. (I.e. the important ratio is the amorphous phase ratio.)

Example 4

In this example a Ziegler catalyst was introduced into a fluidised bed polymerisation reactor as described for Example 1. The catalyst was prepared substantially according to example 1 of U.S. Pat. No. 6,140,264 except that tri-n-octyl aluminium was added after the catalyst precursor was contacted with conventional quantities of an electron donor. The gas phase components are the same except that no pentane was used.

It is desired to produce an ethylene/1-hexene copolymer with a density of 918 kg/m$^3$ and a Melt Index of 0.9 g/10 minutes. The reaction is performed at a temperature of 87° C., and the desired amorphous phase mass ratio of 1-hexene to ethylene is calculated to be 19.

The following gas phase composition is determined in order to obtain the required ratios and maintain them at the required values:
Total pressure=20 bar (2.0 MPa);
Fluidisation velocity=46 cm/s;
Ethylene partial pressure (PC2)=7.5 bar (0.75 MPa);
Ratio of 1-hexene to ethylene partial pressures in gas phase (PC6/PC2)=0.164;
Ratio of hydrogen to ethylene partial pressures (PH2/PC2)=0.145;
Nitrogen balance (with trace ethane);
Condensation rate=2.6%.

The above composition was found to result in the desired polymer at a production rate of 175 kg/h. This Example shows that the required product can be obtained directly by controlling the mass ratios in the amorphous phase on start-up in a Ziegler catalyst system. Compared to a metallocene system as in Examples 1 to 3, the required 1-hexene to ethylene and hydrogen to ethylene mass ratios in the amorphous phase are significantly higher, but the principles of the invention can still be applied.

Example 5

Example 4 was repeated but using 1-octene as comonomer instead of 1-hexene.

It is desired to produce an ethylene/1-octene copolymer with a density of 918 kg/m³ and a Melt Index of 0.9 g/10 minutes i.e. the same as in Example 4. The reaction is performed at a temperature of 87° C., and the desired amorphous phase mass ratio of 1-hexene to ethylene is calculated to be 26.

The following gas phase composition is determined in order to obtain the required ratios and maintain them at the required values:
Total pressure=21 bar (2.1 MPa);
Fluidisation velocity=45 cm/s;
Ethylene partial pressure (PC2)=6 bar (0.6 MPa);
Ratio of 1-octene to ethylene partial pressures in gas phase (PC8/PC2)=0.027;
Ratio of hydrogen to ethylene partial pressures (PH2/PC2)=0.2;
Nitrogen balance (with trace ethane);
Condensation rate=0.

Use of this composition again results in the desired polymer. This Example explicitly shows the different apparent activities for the different comonomers to obtain the same polymer density and melt index. In particular, if gas phase ratio of comonomer to ethylene are compared 1-octene seems to have a reactivity 5 times greater than 1-hexene (5 times less is required). However when comparing the mass ratios in the amorphous phase 1-octene has a reactivity 35% lower than 1-hexene.

The invention claimed is:

1. Method for controlling a process for polymerising at least one olefin in a reaction zone, said process comprising in the reaction zone a reaction mixture and polymer particles, the reaction mixture comprising a principal olefin and at least one further reagent, said method comprising controlling the ratio of at least one further reagent to principal olefin in the polymer particles in the reaction zone or in the amorphous phase of said polymer particles.

2. A method according to claim 1 wherein the reaction mixture comprises a principal olefin, at least one further reagent and at least one alkane having from 4 to 8 carbon atoms, and wherein the process is controlled by:

a) determining the ratio of said at least one further reagent to principal olefin in the polymer particles in the reaction zone or in the amorphous phase of the polymer particles required in order to obtain the polymer it is desired to produce, b) determining conditions in the reactor which will result in the ratio of at least one further reagent to principal olefin determined in step (a), said conditions including at least:
a. the reaction temperature, T;
b. the partial pressure of the at least one alkane in the gas phase, $P_A$;
c. the partial pressure of the principal olefin in the gas phase, $P_O$;
d. the partial pressure of the at least one further reagent in the gas phase, $P_R$; and c) adjusting conditions in the reactor to conditions based on the conditions determined in step (b), thereby adjusting the ratio of at least one further reagent to principal olefin in the polymer particles in the reaction zone or in the amorphous phase of said polymer particles to obtain a ratio based on the ratio determined in step (a), and thereby producing the desired polymer.

3. A method according to claim 2 further comprising:
d) maintaining the conditions in the reactor at conditions based on the conditions determined in step (b).

4. A method according to claim 1 for controlling a process for polymerising at least one olefin in a reaction zone during start-up or transition.

5. A method according to claim 1 wherein the at least one further reagent is selected from comonomers and chain transfer reagents.

6. A method according to claim 1 wherein the principal olefin is selected from ethylene, propylene and 1-butene.

7. A method according to claim 6 wherein a comonomer is present and is selected from olefins, other than the principal olefin, having 2 to 12 carbon atoms.

8. A method according to claim 1 wherein one or more saturated hydrocarbons selected from C4+ alkanes is present at a total partial pressure of at least 0.05 MPa.

9. A method according to claim 1 wherein at least 20 wt % of amorphous phase is present on the polymer.

10. A method according to claim 1 wherein the process is controlled using the ratio of chain transfer reagent to principal olefin and/or the ratio of olefin comonomer to principal olefin.

11. A method according to claim 1 wherein the polymerisation process is carried out continuously in the gas phase.

12. A method according to claim 1 wherein the polymerisation process is carried out in a gas-phase fluidised bed reactor.

13. A method according to claim 1 wherein the polymerisation catalyst is a metallocene catalyst.

14. A method according to claim 13 wherein hydrogen is used as the chain transfer agent and the mass ratio of hydrogen to the principal olefin in the amorphous phase is in the range $1.66 \times 10^{-5} * \ln (MI)$ to $1.66 \times 10^{-5} * \ln (10 \times MI)$, where MI is the melt index of the polymer it is desired to produce.

15. A method according to claim 13 wherein the mass ratio of comonomer to the principal olefin in the amorphous phase is in the range $(953-D)/200$ to $(953-D)*3/100$, where D is the non annealed density in kg/m³ of the polymer that is desired to produce.

16. A method according to claim 1 wherein the catalyst is a Ziegler-Natta catalyst, hydrogen is used as a chain transfer agent, and the mass ratio of hydrogen to the principal olefin in the amorphous phase is in the range $7.1 \times 10^{-4} * \ln (MI/0.7)$ to $0.021 * \ln (MI/0.7)$, where MI is the melt index of the polymer it is desired to produce.

17. A method according to claim 1 wherein the catalyst is a Ziegler-Natta catalyst and the mole ratio of comonomer to the principal olefin in the amorphous phase is in the range (958-D)*3/20 to (958-D)*3/2, where D is the non annealed density in kg/m³ of the polymer that is desired to produce.

18. A process for polymerising at least one olefin in a reaction zone, said process being controlled using the method of claim 1.

19. A method according to claim 8 wherein the one or more saturated hydrocarbons are selected from the group consisting of pentane and hexane.

* * * * *